(12) United States Patent
Mao (10) Patent No.: US 9,164,553 B2
(45) Date of Patent: Oct. 20, 2015

(54) ELECTRONIC DEVICE WITH ROTARY POSITIONING FUNCTION

(71) Applicant: Wistron Corporation, New Taipei (TW)

(72) Inventor: Zhong-hui Mao, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 129 days.

(21) Appl. No.: 14/187,336

(22) Filed: Feb. 24, 2014

(65) Prior Publication Data

US 2015/0109724 A1 Apr. 23, 2015

(30) Foreign Application Priority Data

Oct. 21, 2013 (CN) .......................... 2013 1 0496384

(51) Int. Cl.
*H05K 7/14* (2006.01)
*G06F 1/18* (2006.01)
(52) U.S. Cl.
CPC ...................................... *G06F 1/181* (2013.01)
(58) Field of Classification Search
CPC ....................................................... G01F 1/181
See application file for complete search history.

(56) References Cited

U.S. PATENT DOCUMENTS

| | | | | |
|---|---|---|---|---|
| 6,125,031 A * | 9/2000 | Della Fiora | ............. | G06F 1/181 220/842 |
| 6,130,822 A * | 10/2000 | Della Fiora | ............. | G06F 1/181 16/254 |
| 6,134,116 A * | 10/2000 | Hoss | ......................... | E05C 1/10 292/146 |
| 6,535,379 B1 * | 3/2003 | Smeenge, Jr. | ........... | G06F 1/181 361/679.58 |
| 8,437,132 B2 * | 5/2013 | Lin | ......................... | G06F 1/181 312/223.2 |
| 2002/0097561 A1 * | 7/2002 | Carr | ....................... | G06F 1/181 361/725 |
| 2002/0109966 A1 * | 8/2002 | Crowley | ................. | G06F 1/181 361/679.6 |
| 2003/0026072 A1 * | 2/2003 | Hrehor, Jr. | ................ | E05D 3/06 361/679.6 |
| 2005/0286216 A1 * | 12/2005 | Chen | ....................... | G06F 1/181 361/679.4 |
| 2010/0134964 A1 * | 6/2010 | Smith | ................. | B60R 11/0252 361/679.2 |
| 2010/0156255 A1 * | 6/2010 | Cheng | ..................... | G06F 1/183 312/223.2 |
| 2011/0005139 A1 | 1/2011 | Mao | | |

FOREIGN PATENT DOCUMENTS

TW M454067 5/2013

* cited by examiner

*Primary Examiner* — Hung V Ngo
(74) *Attorney, Agent, or Firm* — Winston Hsu; Scott Margo (57) ABSTRACT

An electronic device includes a bezel, a door and a resilient component. The bezel includes an accommodating portion and a fixing portion. The accommodating portion has a lateral wall whereon a pivot hole is formed. The fixing portion is disposed on the lateral wall. The door is rotatably disposed on the bezel. The door includes a supporting arm, a pivoting portion and at least one engaging portion. The supporting arm is detachably disposed on the accommodating portion. The pivoting portion passes through the pivot hole. The engaging portion is disposed on the pivoting portion. The resilient component is disposed on the bezel by the fixing portion and presses the pivoting portion. The supporting arm rotates relative to the accommodating portion via the pivoting portion to engage the resilient component with the engaging portion, so as to constrain a relatively rotary angle between the door and the bezel.

15 Claims, 10 Drawing Sheets

ELECTRONIC DEVICE WITH ROTARY POSITIONING FUNCTION

BACKGROUND OF THE INVENTION

1. Field of the Invention

The present invention relates to an electronic device with a door capable of rotating relative to a bezel, and more particularly, to an electronic device with rotary positioning function between a door and a bezel.

2. Description of the Prior Art

A conventional computer host includes the casing and the decoration panel. A plurality of electronic components is disposed inside the casing. The electronic components are the processor, the motherboard, the memory module, the hard disk, the optical disk driver, the sound card, the graphics card, the network card and so on. Because the hard disk, the sound card, the graphics card and the network card can be designed as detachable mode according to user's demand, so a plurality of openings is formed on a surface of the decoration panel to expose partial structures of the detachable electronic components for convenient repair. However, appearance of the conventional computer host that exposes the electronic components is inartistic and unsafe, such as drawbacks of current leakage, so that the sheltery door is utilized to movably cover the decoration panel to improve the appearance and safety of the product. The conventional sheltery door cannot be positioned when rotating relative to the decoration panel, which results in accident rotation of the sheltery door by external force, and the conventional sheltery door has drawback of inconvenient repair. Assembly strength between the conventional sheltery door and the decoration panel is insufficient, and the conventional sheltery door is separated from the decoration panel easily by unexpected hit. Thus, design of an assembly of the decoration panel and the sheltery door with positioning function and preferred structural strength is an important issue in the related computer industry.

SUMMARY OF THE INVENTION

The present invention provides an electronic device with rotary positioning function between a door and a bezel for solving above drawbacks.

According to the claimed invention, an electronic device with rotary positioning function includes a bezel, a door and a resilient component. The bezel includes an accommodating portion and a fixing portion. The accommodating portion includes a lateral wall whereon a pivot hole is formed. The fixing portion is disposed on the lateral wall. The door is rotatably disposed on the bezel. The door includes a supporting arm, a pivoting portion and at least one engaging portion. The supporting arm is detachably disposed on the accommodating portion. The pivoting portion is disposed on an end of the supporting arm and passes through the pivot hole. The engaging portion is disposed on the pivoting portion. A fixing end of the resilient component is disposed on the bezel via the fixing portion, and a free end of the resilient component presses the pivoting portion. The supporting arm rotates relative to the accommodating portion via the pivoting portion, so that the free end is engaged with the at least one engaging portion to constrain a rotary angle of the door relative to the bezel.

According to the claimed invention, the door further includes a first engaging portion and a second engaging portion disposed on different positions of the pivoting portion. The door is rotatably switched between a first position and a second position relative to the bezel. The resilient component is engaged with the first engaging portion when the door is rotated to the first position, and the resilient component is engaged with the second engaging portion when the door is rotated to the second position.

The present invention can effectively increase the assembly strength of the door and the bezel to prevent the door from fall by the accident hit. The door can be constrained at the open position and the close position by the graded rotary positioning function to keep the steady angle between the door and the bezel, and detachment of the electronic component from the casing is not interfered by unexpected shake of the door.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
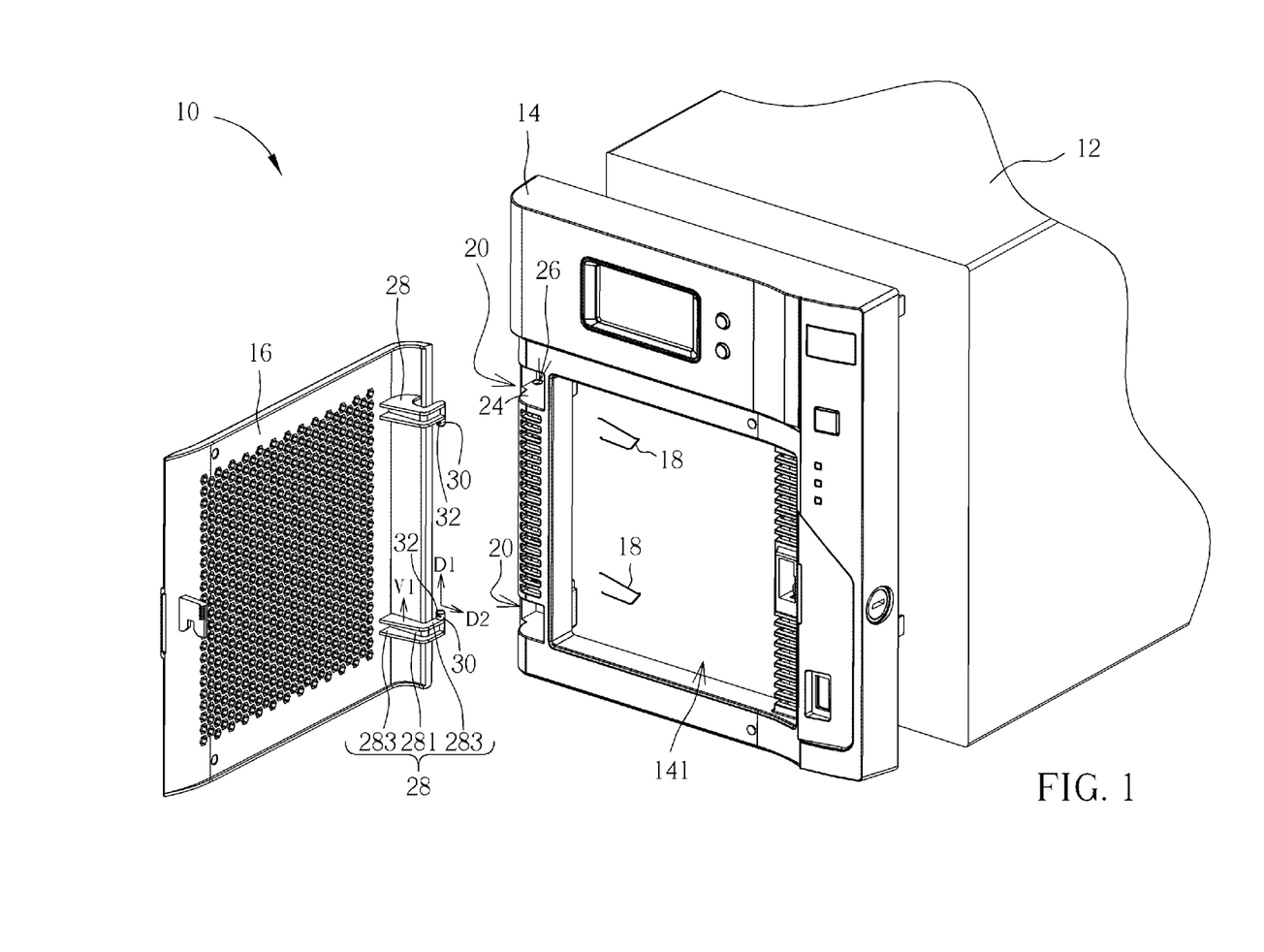
FIG. 1 is an explode diagram of an electronic device according to an embodiment of the present invention.

Please refer to FIG. 1. FIG. 1 is an explode diagram of an electronic device 10 according to an embodiment of the present invention. The electronic device 10 includes a casing 12, a bezel 14, a door 16 and a resilient component 18. A plurality of electronic components (not shown in figures) can be installed inside the casing 12. The electronic component can be a hard disk and so on. The bezel 14 is disposed on the casing 12. An opening 141 is formed on the bezel 14 to expose part of the electronic component, and the electronic component can be detached conveniently for repair. The door 16 is rotatably disposed on the bezel 14. The door 16 can be rotatably switched between a first position and a second position relative to the bezel 14. For example, the door 16 is open when locating at the first position, the door 16 covers the bezel 14 when locating at the second position.

Figure 2:
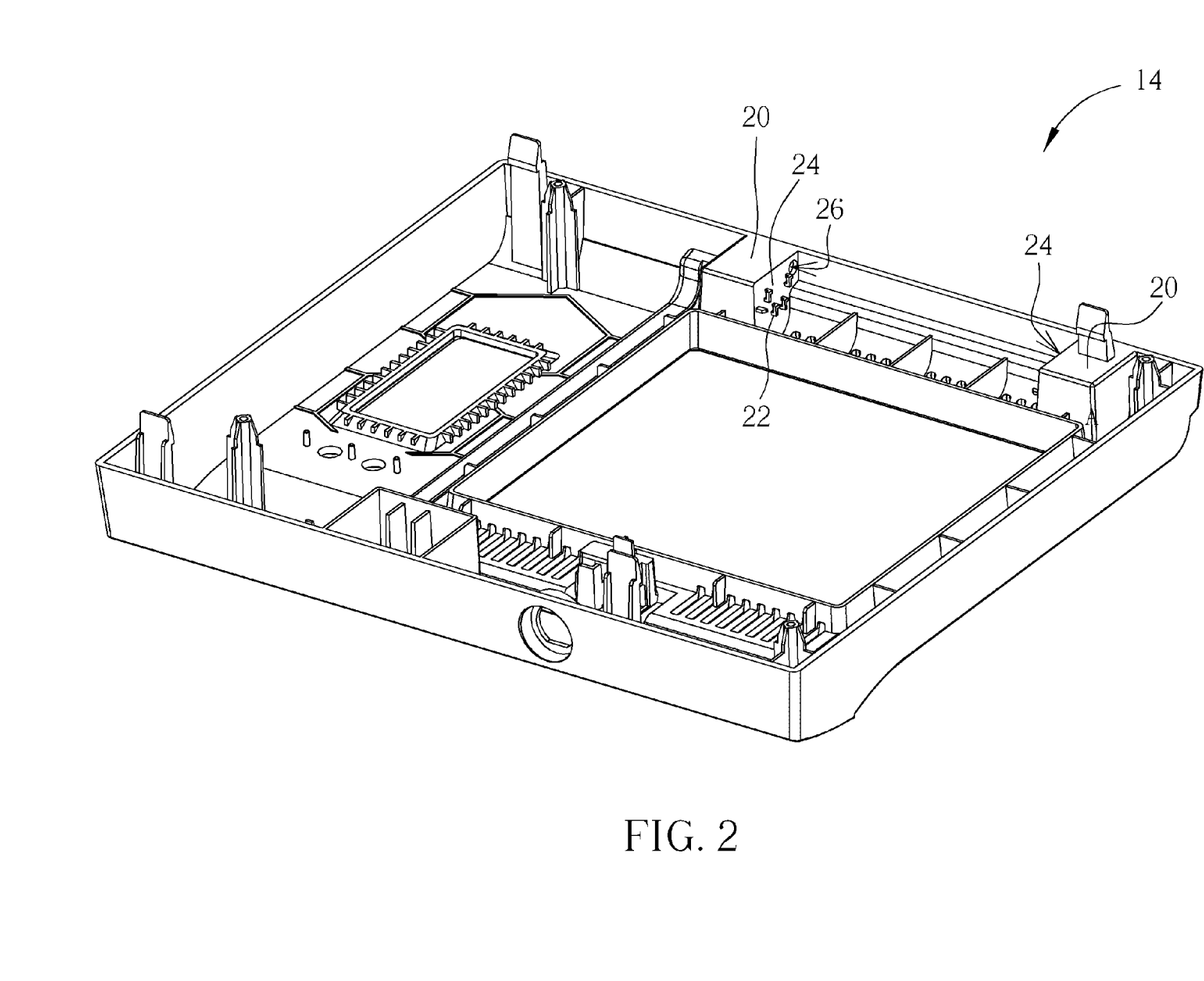
FIG. 2 is a diagram of a bezel in the other view according to the embodiment of the present invention.

Please refer to FIG. 1 and FIG. 2. FIG. 2 is a diagram of the bezel 14 in the other view according to the embodiment of the present invention. The bezel 14 includes an accommodating portion 20 and a fixing portion 22. A pivot hole 26 is formed on a lateral wall 24 of the accommodating portion 20, and the fixing portion 22 is disposed on the lateral wall 24. The door 16 includes a supporting arm 28, a pivoting portion 30 and at least one engaging portion 32. The supporting arm 28 includes a body 281 and a rib 283. The rib 283 is connected to the body 281 for increasing structural strength of the supporting arm 28. An amount of the rib 283 depends on design demand. A normal vector V1 of the rib 283 can be substantially parallel to an axial direction D1 of the pivoting portion 30, and the supporting arm 28 has preferred structural strength along a radial direction D2 of the pivoting portion 30. The pivoting portion 30 is disposed on an end of the supporting arm 28. The supporting arm 28 can be resiliently bent along the axial direction D1 by an external force, so that the pivoting portion 30 can detachably pass through the pivot hole 26 on the accommodating portion 20. The accommodating portion 20 can be a slot structure. The supporting arm 28 moves in and out of the accommodating portion 20 with rotation of the door 16.

The resilient component 18 is disposed on the bezel 14 via the fixing portion 22 and movably presses the pivoting portion 30. The engaging portion 32 is disposed on the pivoting portion 30. According to rotation of the door 16 relative to the bezel 14, the resilient component 18 can be movably switched between the pivoting portion 30 and the engaging portion 32. The resilient component 18 is engaged with the engaging portion 32 to constrain rotary function of the door 16, which means a rotary angle of the door 16 relative to the bezel 14 is constrained. It is to say, the pivoting portion 30 includes at least one engaging portion 32 to engage with the resilient component 18 when the door 16 is located at the first position, and the door 16 can be immovable at the open position (the first position). An amount of the engaging portion 32 is not limited to the above-mentioned embodiment. In this embodiment, an amount of the resilient component 18 is preferably equal to two, and amounts of the accommodating portion 20, the fixing portion 22, the supporting arm 28 and the pivoting portion 30 can be equal to two accordingly. Amounts and selections of the above-mentioned elements depend on design demand.

Figure 3:
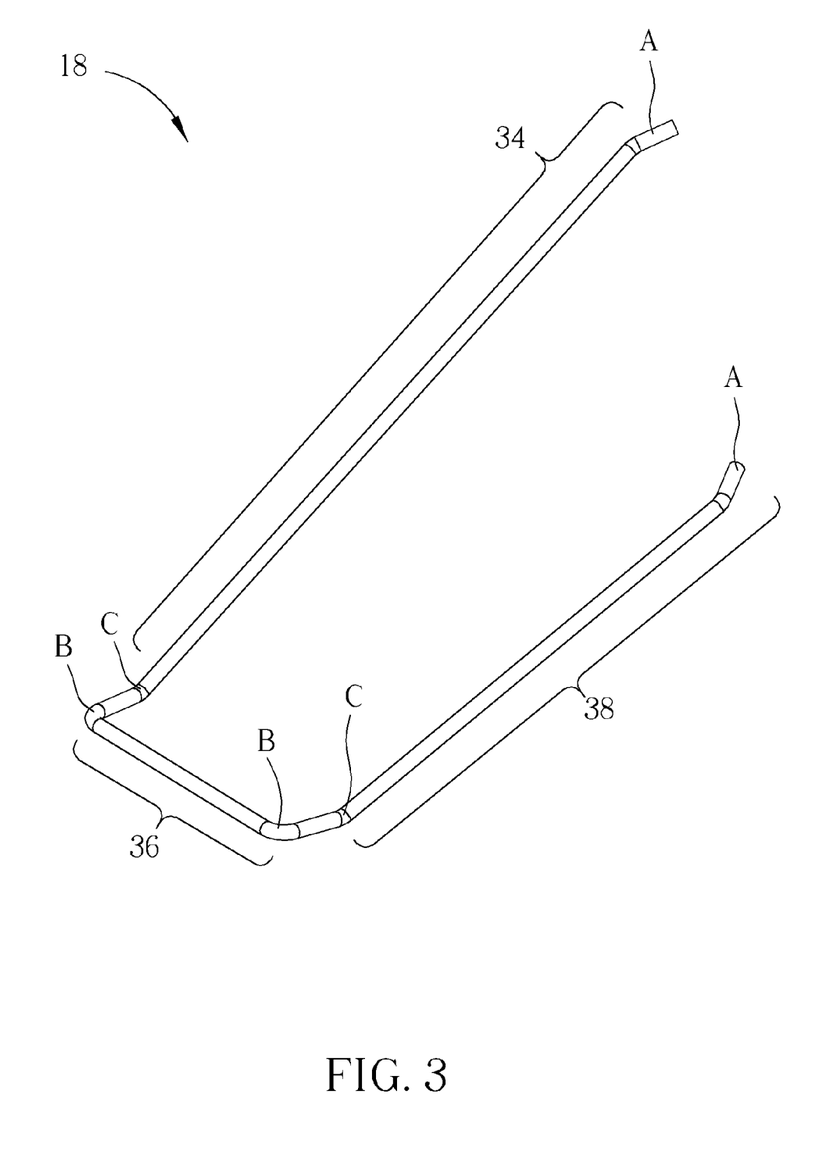
FIG. 3 is a diagram of a resilient component according to the embodiment of the present invention.
Figure 4:
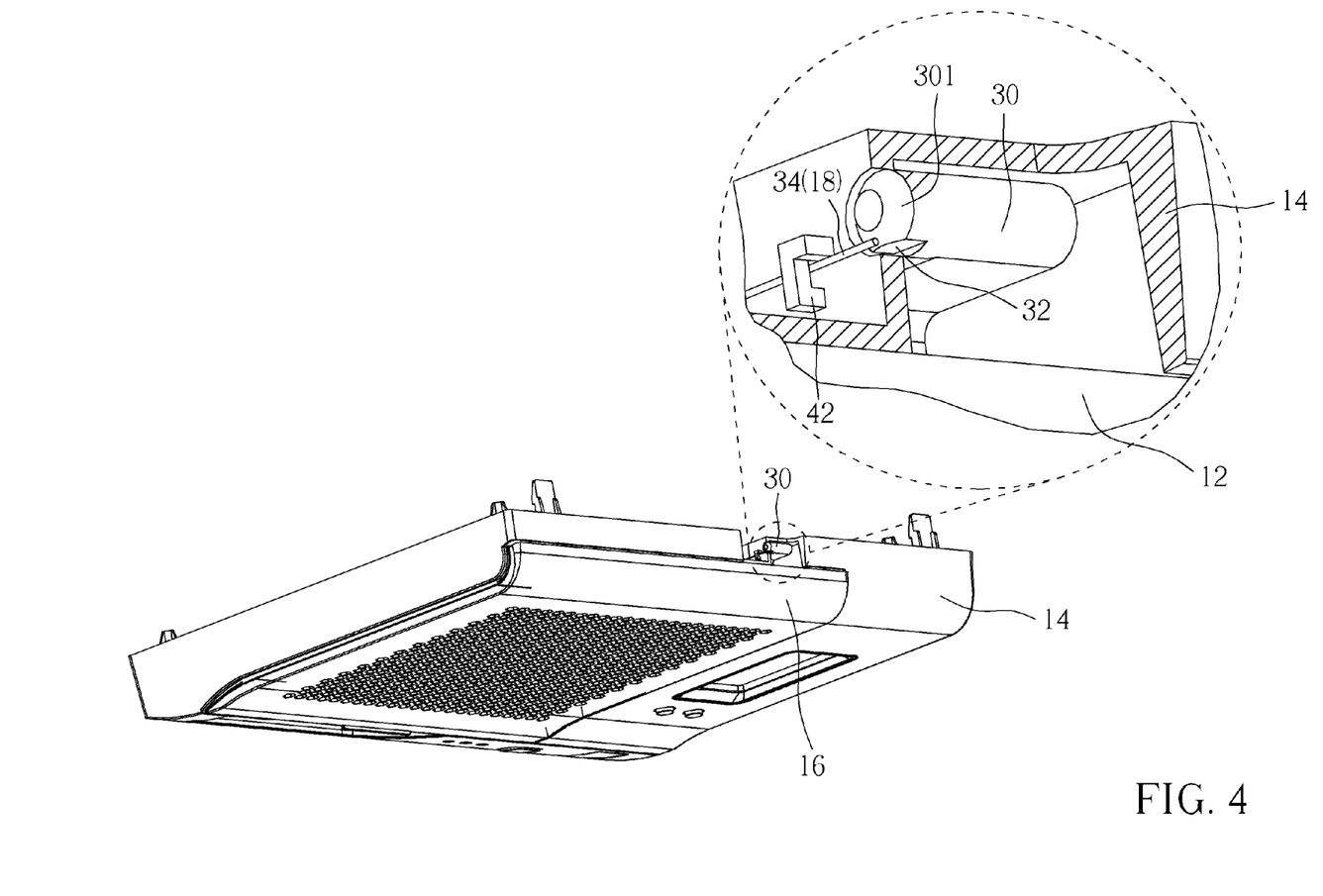
FIG. 4 is an assembly diagram of the bezel and a door according to the embodiment of the present invention.
Figure 5:
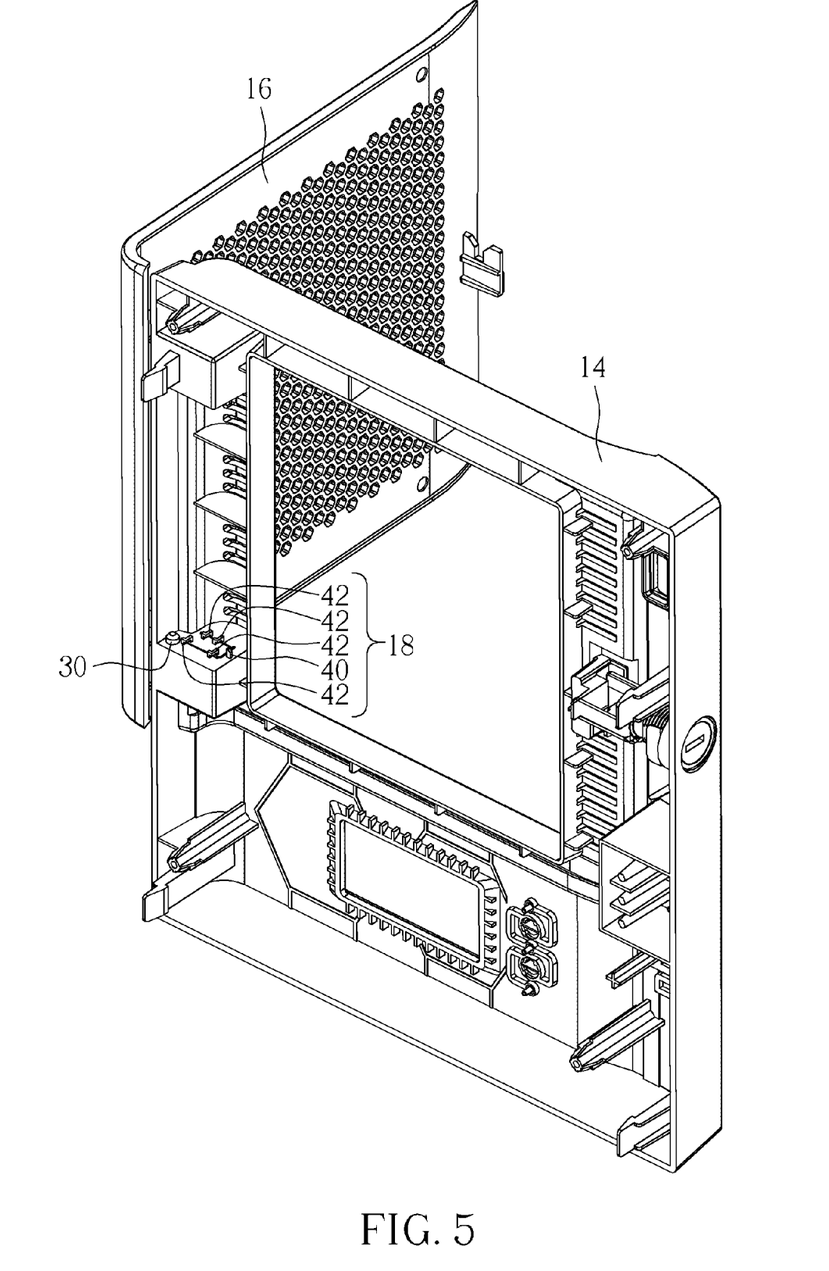
FIG. 5 is an assembly diagram of the bezel, the door and the resilient component according to the embodiment of the present invention.

Please refer to FIG. 3 to FIG. 5. FIG. 3 is a diagram of the resilient component 18 according to the embodiment of the present invention. FIG. 4 is an assembly diagram of the bezel 14 and the door 16 according to the embodiment of the present invention. FIG. 5 is an assembly diagram of the bezel 14, the door 16 and the resilient component 18 according to the embodiment of the present invention. The resilient component 18 preferably can be a U-shaped component, which includes a first part 34, a second part 36 and a third part 38. The second part 36 is connected between the first part 34 and the third part 38. Curved sections A are disposed on ends of the first part 34 and the third part 38 that are opposite to the second part 36. The resilient component 18 can be easily assembled with the fixing portion 22 to dispose on the bezel 14 via the curved sections A. In addition, ends of the second part 36 are respectively connected to the first part 34 and the third part 38 in a dual bendy manner, such as the bending point B and the bending point C shown in FIG. 3. The second part 36 is raised than the first part 34 and the third part 38 for convenient assembly/disassembly of the resilient component 18.

The fixing portion 22 includes a contact structure 40 and a plurality of constraint structures 42. When the resilient component 18 is assembled with the fixing portion 22, the first part 34 and the third part 38 respectively pass through the corresponding constraint structures 42 to constrain a movement of the resilient component 18 relative to the bezel 14. The second part 36 movably contacts against the contact structure 40 to prevent the resilient component 18 and the fixing portion 22 from separation. When the fixing end (the second part 36 and the third part 38) of the resilient component 18 is disposed on the bezel 14 via the constraint structure 42, the free end (the first part 34) of the resilient component 18 is suspended over the pivot hole 26 and aligns with the inclined surface 301 of the pivoting portion 30, as shown in FIG. 4. The pivoting portion 30 inserts into the pivot hole 26, and the inclined surface 301 drives the resilient component 18 to generate resilient deformation. The first part 34 of the resilient component 18 presses the lateral surface of the pivoting portion 30, as shown in FIG. 5, and the first part 34 can be movably switched between the pivoting portion 30 and the engaging portion 32 according to rotation of the door 16.

Structure of the resilient component 18 is not limited to the above-mentioned U-shaped component. For example, the resilient component 18 further can be a L-shaped component including the first part 34 and the second part 36. The fixing end (the second part 36) of the L-shaped component is disposed on the bezel 14 via the fixing portion 22, the free end (the first part 34) of the L-shaped component is suspended over the pivot hole 26 to movably press the pivoting portion 30 or the engaging portion 32. Further, the resilient component 18 can be a bar component including the first part 34. The fixing end of the bar component is disposed on the bezel 14 via the fixing portion 22, the free end of the bar component points the pivot hole 26 and movably presses the pivoting portion 30 or the engaging portion 32. Further, the resilient component 18 can be designed as an annular component or a curved component. Structure of the resilient component 18 capable of applying the stable pressure to the pivoting portion 30 belongs to scopes of the present invention. The fixing portion 22 is not limited to assembly of the contact structure and the constraint structure as mentioned above. Elements of the fixing portion 22 are designed according to structure of the resilient component 18.

Figure 6:
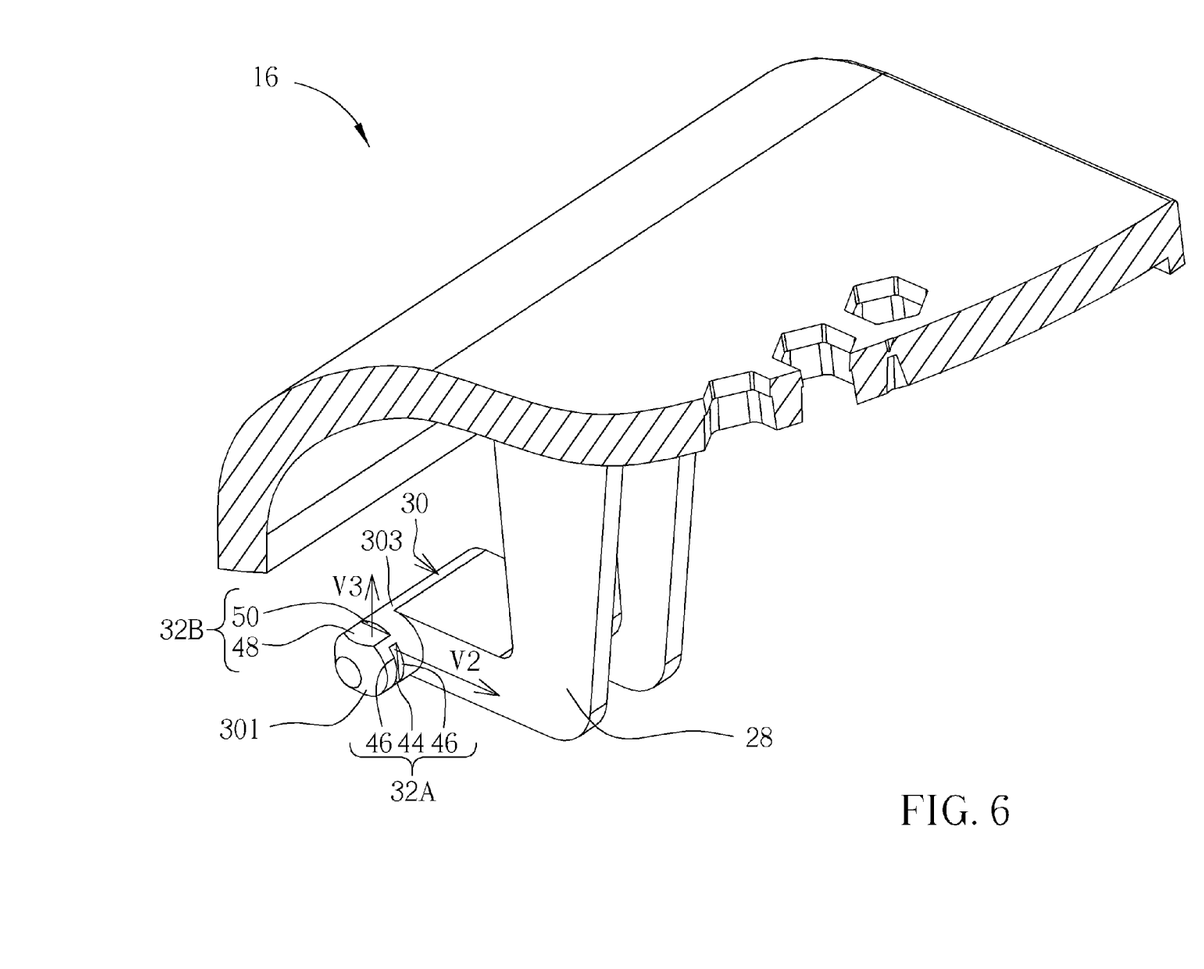
FIG. 6 is a partial diagram of the door according to the embodiment of the present invention.

Please refer to FIG. 6. FIG. 6 is a partial diagram of the door 16 according to the embodiment of the present invention. The pivoting portion 30 can be a cylinder structure. An end of the cylinder structure is connected to the supporting arm 28, an inclined surface 301 is formed on the other end of the cylinder structure, and an annular arc 303 is formed between the ends of the cylinder structure. An amount of the engaging portion 32 can be preferably equal to two, such as the first engaging portion 32A and the second engaging portion 32B respectively indented on different position of the annular arc 303 of the pivoting portion 30. The first engaging portion 32A includes a bottom 44 and two contact surfaces 46. The contact surfaces 46 are respectively connected to opposite edges of the bottom 44 to form a sunken structure. The second engaging portion 32B includes a plane surface 48 and a lateral surface 50. An edge of the plane surface 48 is connected to the lateral surface 50, and the other edge of the plane surface 48 is an open edge. The resilient component 18 is engaged with the first engaging portion 32A when the door 16 is located at the first position, and the resilient component 18 is engaged with the second engaging portion 32B when the door 16 is located at the second position. An angle formed between a normal vector V2 of the bottom 44 and a normal vector V3 of the plane surface 48 along the radial direction (such as the direction D2 shown in FIG. 1) of the pivoting portion 30 is substantially equal to a predetermined angle, and the predetermined angle represents the maximum unfolded angle of the door 16 relative to the bezel 14.

Figure 7:
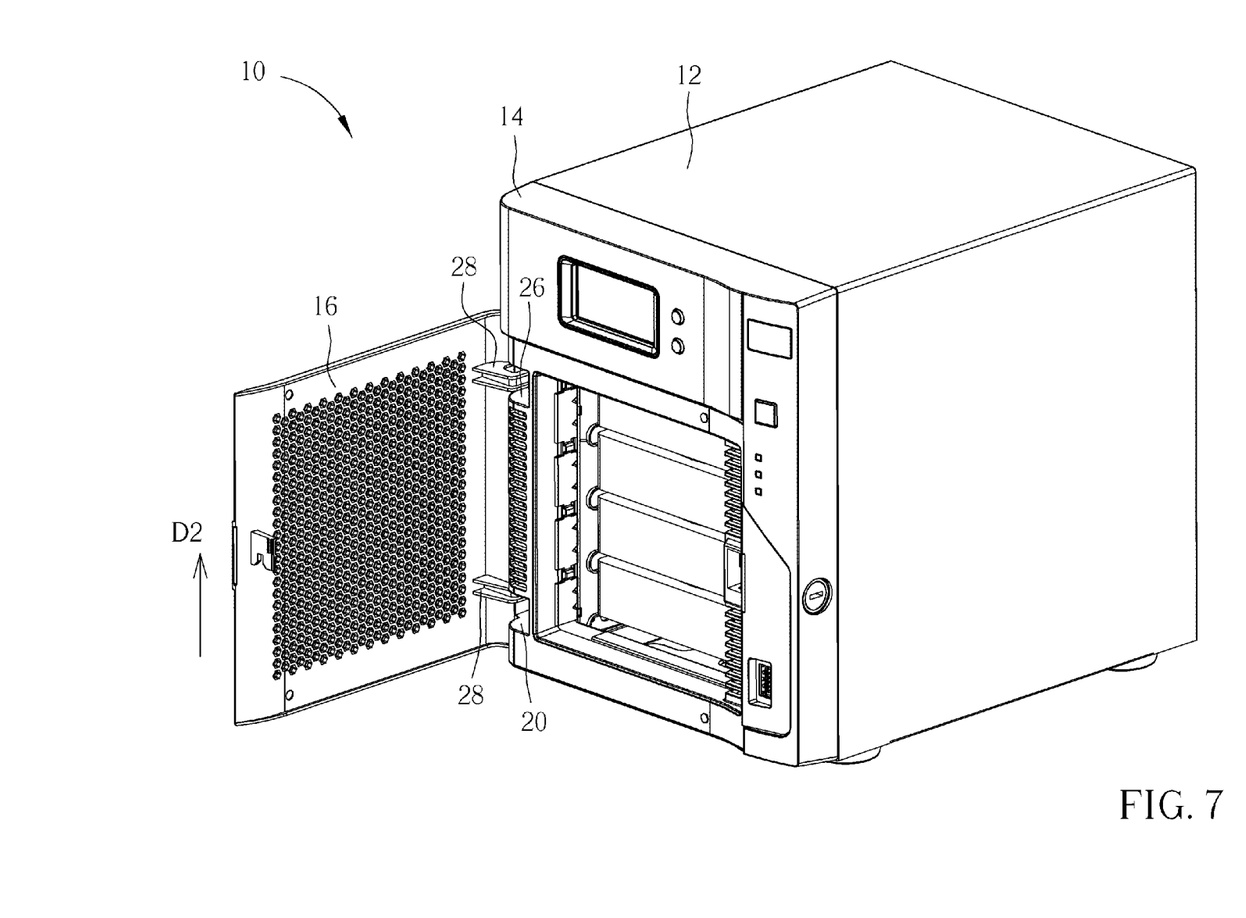
FIG. 7 is a diagram of the unfolded door and the bezel according to the embodiment of the present invention.
Figure 8:
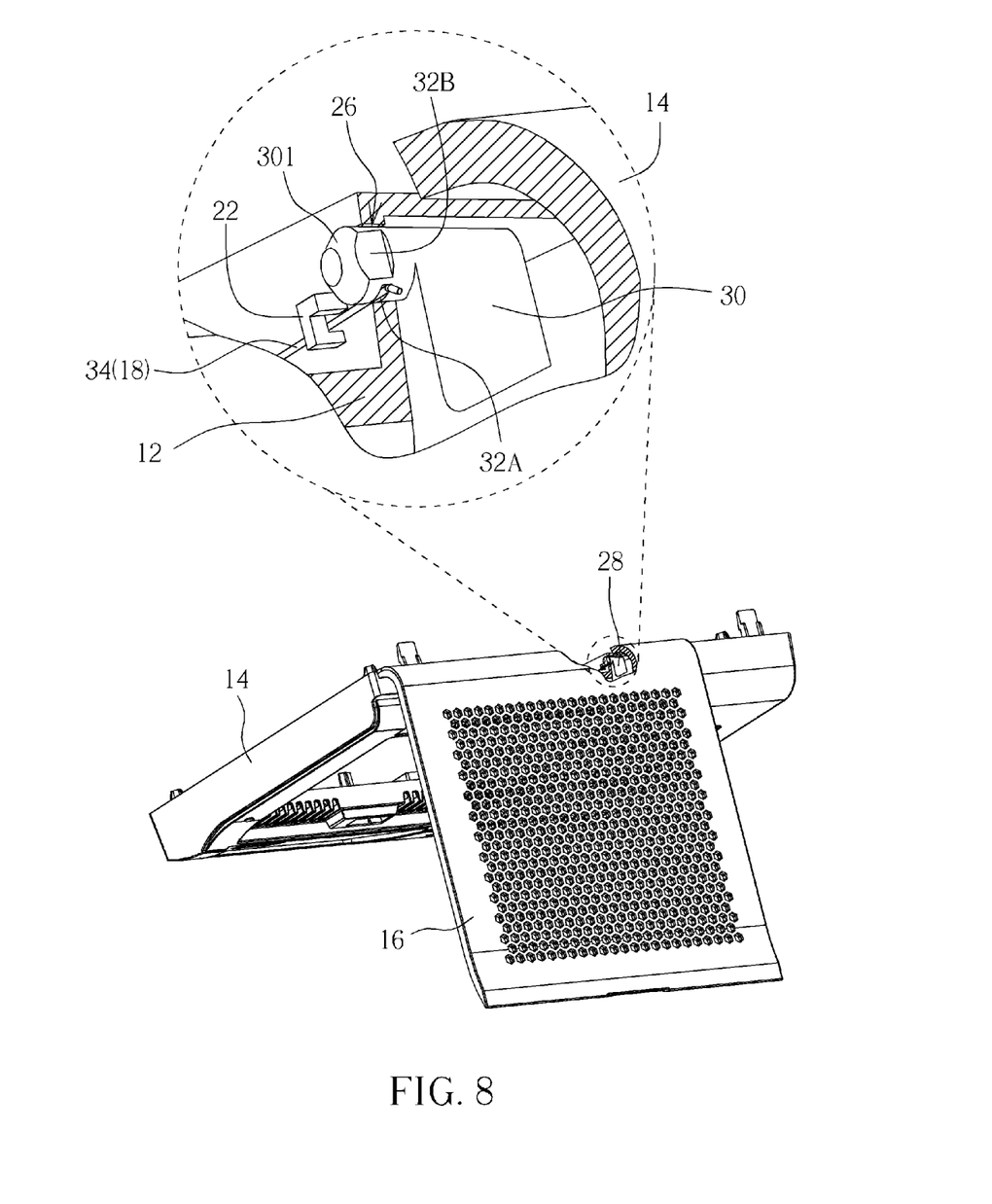
FIG. 8 is an enlarged diagram of the electronic device in the other view shown in FIG. 7.

Please refer to FIG. 7 and FIG. 8. FIG. 7 is a diagram of the unfolded door 16 and the bezel 14 according to the embodiment of the present invention. FIG. 8 is an enlarged diagram of the electronic device 10 in the other view shown in FIG. 7. As shown in FIG. 7 and FIG. 8, the door 16 is unfolded relative to the bezel 14 and located at the first position. The angle between the door 16 and the bezel 14 is substantially equal to the predetermined angle formed by the normal vectors V2, V3. The free end (the first part 34) of the resilient component 18 is engaged inside the sunken structure of the first engaging portion 32A. For moving the door 16 away from the first position, an external force larger than a resilient recovering force, which is generated by resilient deformation of the resilient component 18 to overcome structural difference between the first engaging portion 32A and the annular arc 303, is applied to the door 16, so that the free end of the resilient component 18 can move from the first engaging portion 32A to the second engaging portion 32B via the annular arc 303. Therefore, the door 16 is immovable at the first position to prevent the door 16 and the bezel 14 from rotation by accident hit or wind power.

The first engaging portion 32A is the sunken structure formed by the bottom 44 and the contact surfaces 46. When the door 16 is located at the first position, the free end of the resilient component 18 presses the bottom 44 of the first engaging portion 32A, the contact surfaces 46 of the first engaging portion 32A respectively block opposites sides of the resilient component 18, and the resilient component 18 cannot be separated from the sunken structure. Thus, the first engaging portion 32A can effectively prevent the pivoting portion 30 from sliding out of the pivot hole 26 on the accommodating portion 20 along the radial direction D2, so as to avoid separation of the door 16 and the bezel 14 by the accident hit.

Figure 9:
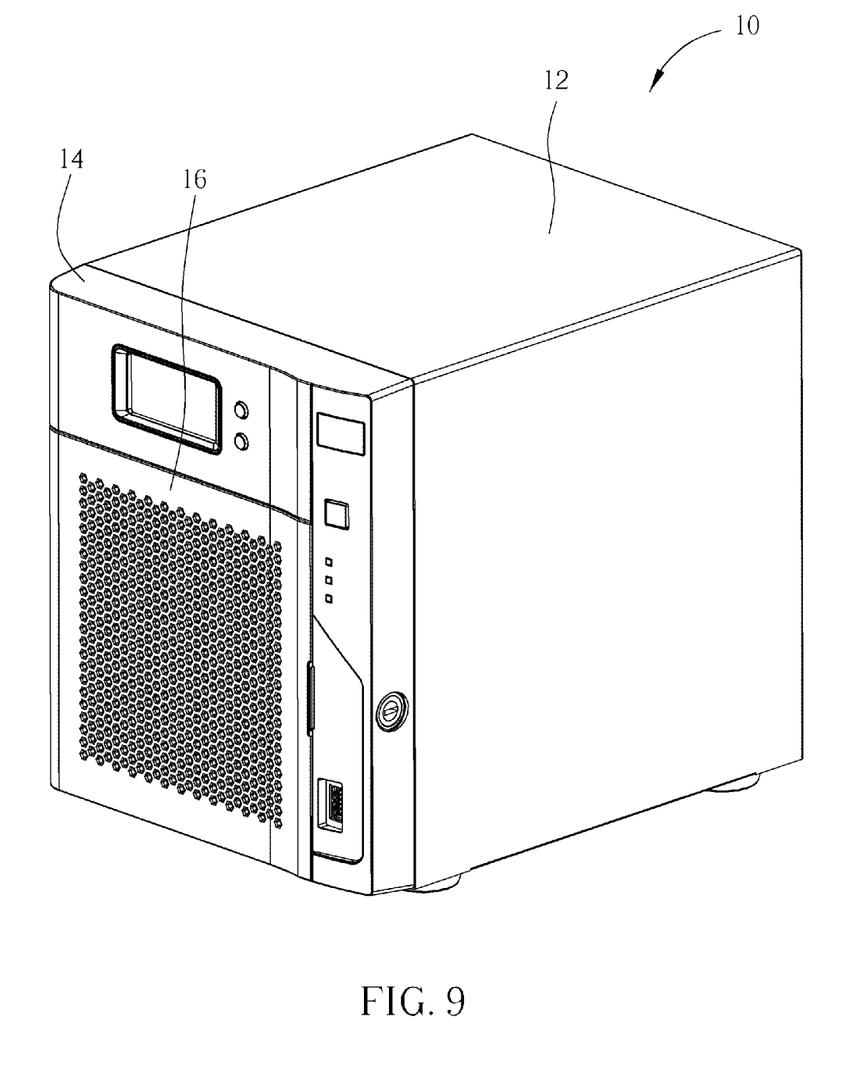
FIG. 9 is a diagram of the folded door and the bezel according to the embodiment of the present invention.
Figure 10:
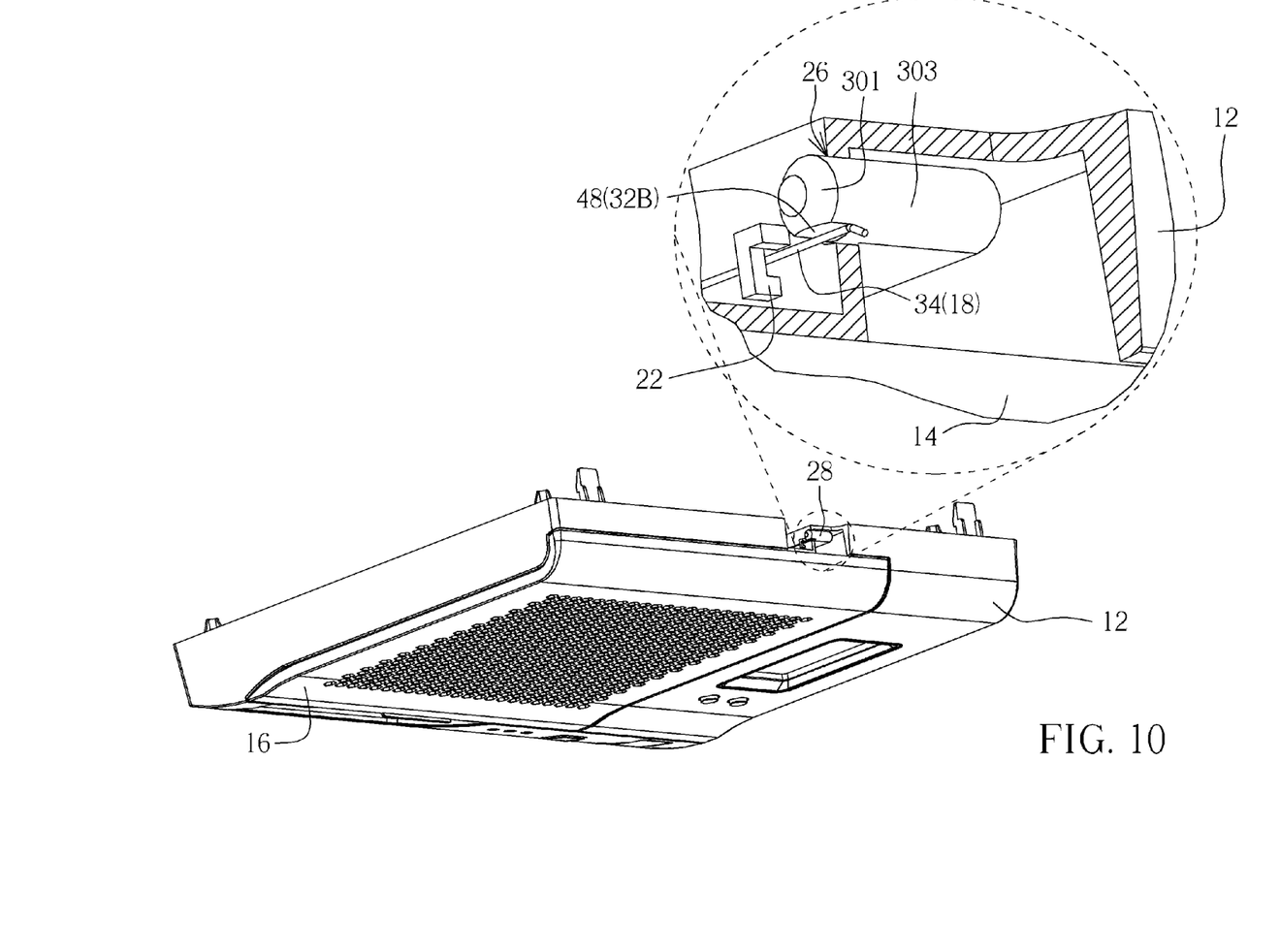
FIG. 10 is an enlarged diagram of the electronic device in the other view shown in FIG. 9.

Please refer to FIG. 9 and FIG. 10. FIG. 9 is a diagram of the folded door 16 and the bezel 14 according to the embodiment of the present invention. FIG. 10 is an enlarged diagram of the electronic device 10 in the other view shown in FIG. 9. As shown in FIG. 9 and FIG. 10, the door 16 is located at the second position to cover the bezel 14. The free end (the first part 34) of the resilient component 18 is engaged with the second engaging portion 32B, which means the free end presses the plane surface 48 of the second engaging portion 32B. For moving the door 16 away from the second position, an external force larger than the resilient recovering force, which is generated by the resilient deformation of the resilient component 18 to overcome structural difference between the second engaging portion 32B and the annular arc 303, is applied to the door 16, so that the free end of the resilient component 18 cam move from the second engaging portion 32B to the first engaging portion 32A via the annular arc 303. Therefore the door 16 is immovable at the second position when the door 16 covers the bezel 14.

In conclusion, the electronic device of the present invention utilizes the fixing portion to dispose the resilient component on the bezel, and the free end of the resilient component is suspended and points toward the pivot hole on the accommodating portion. The two supporting arms of the door can be forced outwardly along the axial direction, to be respectively engaged with the accommodating portions of the bezel. The pivoting portion of the supporting arm passes through the pivot hole on the accommodating portion to contact the resilient component disposed on the bezel. Generally, the door is assembled with the bezel at the second position (an initial position) when the door covers the bezel. As the pivoting portion passes through the pivot hole, the inclined surface of the pivoting portion contacts the free end of the resilient component to generate resilient deformation of the resilient component, and the free end of the resilient component moves from the inclined surface to the plane surface of the second engaging portion.

The pivoting portion is revolved relative to the pivot hole with rotation of the door when the door is opened. The force applied to the door is greater than the resilient recovering force of the resilient component that overcomes the structural difference between the second engaging portion and the annular arc. When the door is switched between the first position and the second position, the free end of the resilient component presses and moves relative to the annular arc, and the resilient component can smoothly move from the annular arc to the first engaging portion based on the flat surface of the annular arc. The resilient recovering force is released to press the resilient component on the bottom of the first engaging portion. When the door is located at the first position, the free end of the resilient component is stably engaged inside the sunken structure of the first engaging portion. The force applied to the door is greater than the resilient recovering force of the resilient component that overcomes the structural difference between the first engaging portion and the annular arc for closing the door. Thus, the electronic device can utilize the resilient component and the engaging portion to stay the door at the open position (the first position) and the close position (the second position), to provide functions of stable assembly and graded rotary switch between the door and the bezel.

Comparing to the prior art, the present invention can effectively increase the assembly strength of the door and the bezel to prevent the door from fall by the accident hit. The door can be constrained at the open position and the close position by the graded rotary positioning function to keep the steady angle between the door and the bezel, and detachment of the electronic component from the casing is not interfered by unexpected shake of the door.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic device with rotary positioning function, the electronic device comprising:
   a bezel, the bezel comprising:
      an accommodating portion, the accommodating portion comprising a lateral wall whereon a pivot hole is formed; and
      a fixing portion disposed on the lateral wall;
   a door rotatably disposed on the bezel, the door comprising:
      a supporting arm detachably disposed on the accommodating portion;
      a pivoting portion disposed on an end of the supporting arm and passing through the pivot hole; and
      at least one engaging portion disposed on the pivoting portion; and
   a resilient component, a fixing end of the resilient component being disposed on the bezel via the fixing portion, a free end of the resilient component pressing the pivoting portion, the supporting arm rotating relative to the accommodating portion via the pivoting portion, so that the free end is engaged with the at least one engaging portion to constrain a rotary angle of the door relative to the bezel.

2. The electronic device of claim 1, wherein the door further comprises a first engaging portion and a second engaging portion disposed on different positions of the pivoting portion, the door is rotatably switched between a first position and a second position relative to the bezel, the resilient component is engaged with the first engaging portion when the door is rotated to the first position, and the resilient component is engaged with the second engaging portion when the door is rotated to the second position.

3. The electronic device of claim 2, wherein a predetermine angle is formed between the door and the bezel when the door is located at the first position, the door covers the bezel when the door is located at the second position.

4. The electronic device of claim 3, wherein the first engaging portion comprises a bottom and two contact surfaces, the two contact surfaces are respectively connected to opposite edges of the bottom.

5. The electronic device of claim 4, wherein the resilient component is engaged inside a sunken structure formed between the bottom and the contact surfaces.

6. The electronic device of claim 4, wherein the second engaging portion comprises a plane surface and a lateral surface, an edge of the plane surface is connected to the lateral surface, and the other edge of the plane surface is an open edge.

7. The electronic device of claim 6, wherein an angle formed between a normal vector of the bottom of the first engaging portion and a normal vector of the plane surface of the second engaging portion along a radial direction of the pivoting portion is substantially equal to the predetermined angle.

8. The electronic device of claim 1, wherein the accommodating portion is a slot structure, the supporting arm is adapted to move in and out of the slot structure with rotation of the door.

9. The electronic device of claim 1, wherein the supporting arm comprises a body and a rib, the rib is connected to the body, and a normal vector of the rib is substantially parallel to an axial direction of the pivoting portion.

10. The electronic device of claim 1, wherein the pivoting portion is a cylinder structure, an end of the cylinder structure is connected to the supporting arm, and an inclined surface is formed on the other end of the cylinder structure.

11. The electronic device of claim 10, wherein the free end of the resilient component is suspended over the pivot hole and aligns with the inclined surface.

12. The electronic device of claim 10, wherein the at least one engaging portion is indented on an annular arc between the two ends of the cylinder.

13. The electronic device of claim 1, wherein the resilient component is an U-shaped component, the U-shaped component comprises a first part, a second part and a third part, the second part is connected between the first part and the third part.

14. The electronic device of claim 13, wherein the fixing portion comprises a contact structure and a plurality of constraint structures, the second part movably contacts against the contact structure, the first part and the third part respectively pass through the corresponding constraint structures.

15. The electronic device of claim 13, wherein two ends of the second part are respectively connected to the first part and the third part in a dual bendy manner.

* * * * *